Dec. 15, 1925. 1,565,605
E. VAN DER MOLEN
APPARATUS FOR REMOVING MATERIAL FROM THE WALL OF A REVOLVING
CENTRIFUGAL BASKET SUSPENDED FROM A VERTICAL SPINDLE
Filed Dec. 16, 1924  2 Sheets-Sheet 1
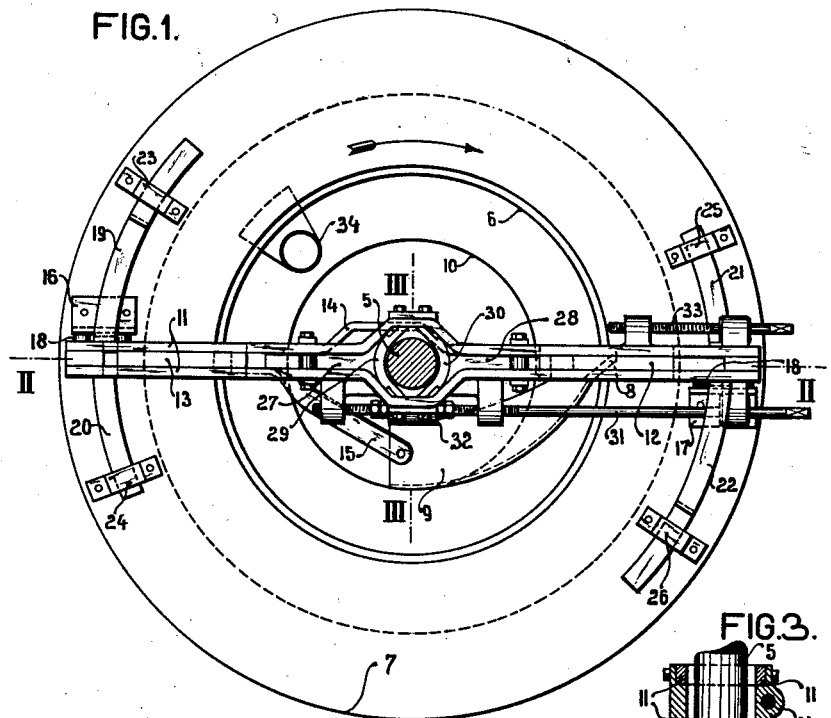
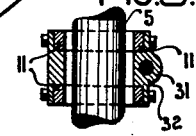
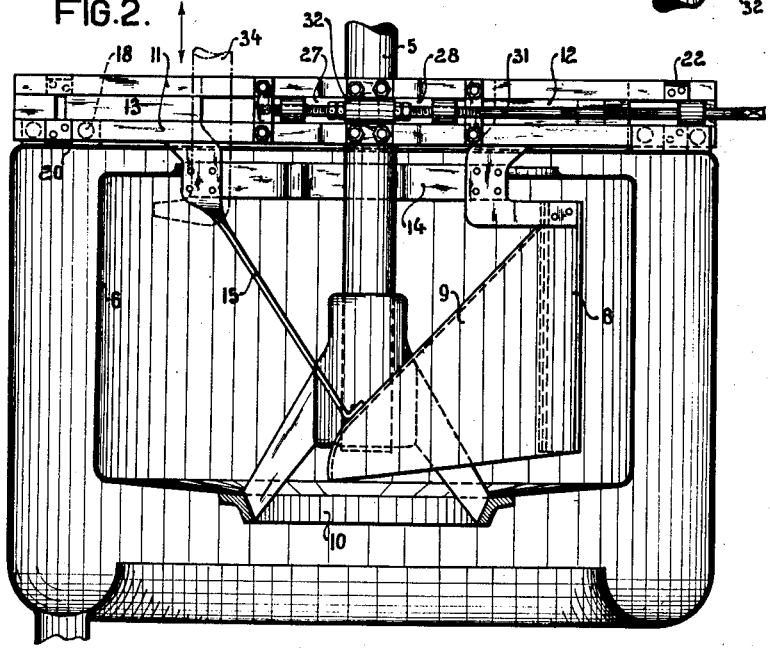
Inventor
Evert van der Molen Patented Dec. 15, 1925.

1,565,605

UNITED STATES PATENT OFFICE.

EVERT VAN DER MOLEN, OF GRONINGEN, NETHERLANDS.

APPARATUS FOR REMOVING MATERIAL FROM THE WALL OF A REVOLVING CENTRIFUGAL BASKET SUSPENDED FROM A VERTICAL SPINDLE.

Application filed December 16, 1924. Serial No. 756,333.

*To all whom it may concern:*

Be it known that I, EVERT VAN DER MOLEN, a subject of the Queen of Holland, residing at Groningen, the Netherlands, have invented certain new and useful improvements in and relating to apparatus for removing material from the wall of a revolving centrifugal basket suspended from a vertical spindle, of which the following is a specification.

This invention relates to apparatus for removing the accumulation of sugar or other material from the wall of a revolving centrifugal basket suspended from a vertical, preferably flexible spindle, of the type, in which a knife within the basket is adapted to be forced against and fed into the said accumulation so as to scrape it off, and in which a plough secured to said knife directs the loosened material inwardly towards a central discharge opening in the bottom. The object of my invention is to so arrange a device of this character that during the scraping action of the knife the latter is constrained to keep always in the same relative position to the basket should the basket swing due, for instance, to unbalanced load.

Figure 4:
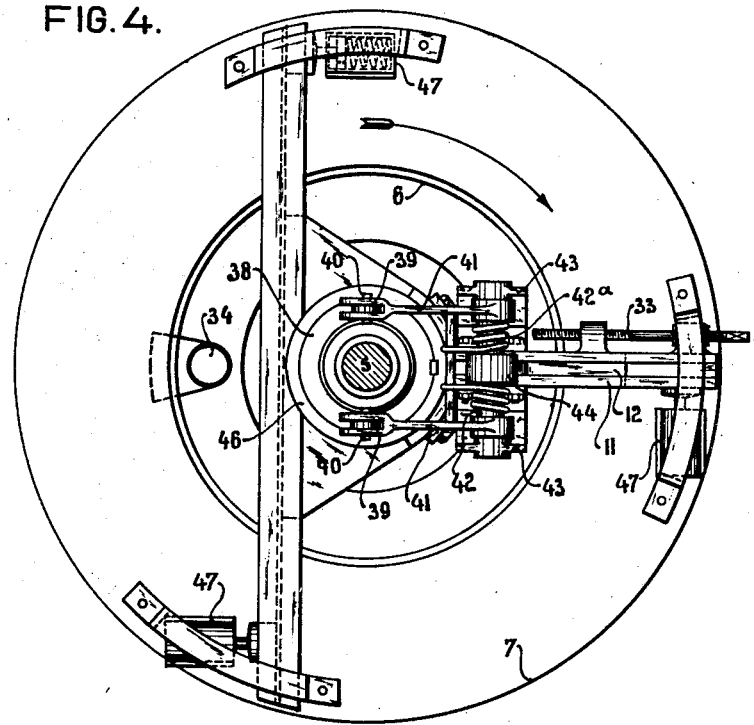
Figure 5:
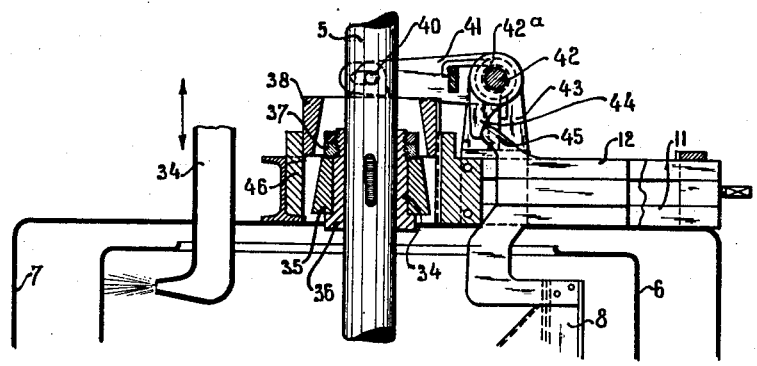

In order that my invention may be well understood, I shall now proceed to describe the same with reference to the annexed drawing, in which:

Fig. 1 is a plan view of a centrifugal machine provided with a device in accordance with my invention, Fig. 2 is partly a side elevational view, partly a vertical sectional view of this machine and Fig. 3 is a sectional view along the line III—III in Fig. 1, Fig. 4 is a plan view of a centrifugal machine provided with another apparatus embodying my invention, whereas Fig. 5 is partly a side elevational view, partly a vertical sectional view of the machine shown in Fig. 4.

Referring to Figs. 1, 2 and 3, the vertical spindle 5 is provided with a hub member, secured to which is the basket 6 within the stationary or monitor casing 7. The spindle 5, which extends upwardly through a relatively considerable distance, is driven by a suitable overhead gearing (not shown) and permits the basket to swing or oscillate about a centre of gravity located outside the spindle axis. This swinging motion occurs not only during the supply of the mass to be separated, but also after the liquid has been forced out through the wall of the basket.

The knife or cutting blade referred to above is indicated by 8, the plough secured thereto by 9. The knife 8 should be fed at a uniform rate into the cake accumulated on the inner wall of the basket, so that the loosened material may be directed by the plough 9 inwardly towards the central bottom opening 10, without the spindle of the centrifugal being thrown out of line through an appreciable distance. For this purpose the machine is provided with a horizontal beam 11 composed of four parallel, rigidly interconnected bars (Fig. 3) forming a guideway for two slides 12 and 13 on opposite sides of spindle 5. Slide 12 carries the knife 8 and the plough 9 secured thereto, whereas slide 13 is connected through an offset strip 14 to the slide 12 and through a strut 15 to the plough 9, a screw spindle 33 serving to move the slides radially inwards and outwards. The beam 11 is supported by the annular top plate or curb of the casing 7 in such a manner as to have a certain freedom of horizontal motion relative to said casing. Secured to the curb are two diametrically opposed angle pieces 16, 17 each provided with a rubber buffer 18, said buffers preventing the beam 11 from rotating in a horizontal plane in the direction of rotation of the basket 6. Furthermore, the beam 11 is prevented from canting or rocking under the influence of the thrust of the relatively hard cake on the knife, by means of horizontal arcuate arms 19, 20, 21, 22 secured to the beam and having a certain amount of horizontal clearance in stirrups 23, 24, 25, 26 bolted to the curb.

Adjacent to and on opposite sides of the spindle 5 the beam 11 is provided with two slides 27 and 28 having bearings 29, 30 respectively, each bearing being adapted to encircle the spindle through about one fourth of its circumference and provided at either side of its cylindrical face with diverging extensions. The slides 27, 28 can be moved towards and away from one another by means of a spindle 31 having right and left hand screw threads and rotatably mounted, but prevented from lengthwise movement, in a bracket 32 secured to the beam 11.

In the position shown in Figs. 1 and 2, the bearings 29, 30 allow the spindle 5 to swing freely through an appreciable distance, but when the slides 27 and 28 are moved towards each other by means of the screw spindle 31, the said bearings engage and snugly fit around spindle 5, whereby the beam 11 with associate parts is constrained to follow the swinging motion of the basket 6.

It goes without saying that the bearings 29, 30 should be kept a sufficient distance away from the spindle 5 as long as the mass to be separated is supplied and the liquid therein is forced through the cylindrical wall of the basket and also, that said bearings may engage the spindle only after removal of the liquid from the basket, when the oscillatory movement of the spindle is minimized. After the bearings 29, 30 have engaged the spindle 5, the beam 11 will jerk against the buffers 18 as long as the basket is swinging, but as soon as the inwardly moving knife 8 will have scraped off the irregular surface of the cake, the main cause of the swing is removed and from this moment onward the emptying of the basket is effected at a uniform rate as the knife 8 is entered into the cake, the thrust imparted by the cake to the knife and to the plough being responsive to the rate of rotation of the screw spindle 33.

The mass to be separated is supplied by a vertically movable pipe 34 having a nozzle adapted to direct the mass radially outwards onto the wall of the basket. Said movable pipe could be substituted by a stationary pipe cooperating with a pivotally mounted guide screen adapted to direct the flow of the mass in such a manner as to produce a cake of substantially uniform thickness throughout.

If the dry cake in the basket is to be treated with steam, the top opening of the monitor casing can simply be closed by means of a cover provided over or underneath beam 11.

In the example illustrated, the knife 8 extends through substantialy the full height of the cake accumulated on the wall of the basket, but if desired a shorter knife could be used, when the knife should be capable of reciprocatory motion along a vertical guideway as is the case in certain prior constructions of apparatus of this character.

The cutting edge of the knife may be indented so as to be better adapted to loosen relatively hard material such as sugar. Moreover, the knife may be mounted for rotation about a vertical axis, whereby its cutting angle can be adjusted. Such an adjustable knife could be associated with a brush for cleaning the basket.

Instead of using one single knife, I can use two diametrically opposed knives, thereby providing a balanced system. A characteristic feature of my novel construction is, that the guideway for the scraper is movable in a horizontal plane but otherwise prevented from rotating with the spindle or with the scraper, and that said guideway can be coupled with the spindle of the basket by means of a clutchlike device. It is obviously not necessary for the guideway to be held in position by the monitor casing itself, for it could as well be supported by a bracket or a frame which is independent of said casing.

In the example illustrated in Figs. 1 and 2, the clutch for coupling the guideway of the scraper or the knife with the spindle of the basket engages the spindle through two bearing blocks, but it will be readily understood that the clutch could also be made to engage the spindle on three or more sides. For instance, I could use four bearing blocks spaced 90° apart and adapted to be simultaneously moved into engagement with the spindle by means of a rotatable ring having four eccentric guideways therein.

In order that the knife cannot be entered into the space occupied by the cake prior to its guideway being coupled with the spindle of the basket so as to be constrained to follow the swinging motions imparted thereto, I prefer to operatively couple the means for moving the knife towards the wall of the basket, with those for actuating the clutch. Referring to Figs. 4 and 5 of the drawing, in which like parts are designated by the same numerals as in Figs. 1–3, the spindle 5 has keyed to it a bush 34 serving as a bearing for a ring 35 locked between a collar 36 and nuts 37 screwed on a reduced portion of the bush. Ring 35, which has a conical outer surface, is adapted for cooperation with a mating ring 38, having a conical inner surface and a cylindrical outer surface and provided with two lugs 39. Laterally extending pins 40 on said lugs project into elongated slots in long lever arms 41 secured to a shaft 42, which is supported by a bracket 43 bolted to the beam 11. Intermediate between the long lever arms 41, the shaft 42 has keyed to it a short lever arm 44 adapted for cooperation with a projection 45 of the slide 12, to which the knife 8 and the plough 9 are secured. Coiled springs 42$^a$ acting on the long lever arms 41 tend to force the ring 38 downwards into engagement with ring 35 whereby, since ring 38 fits in a cylindrical guide sleeve 46 of the beam 11, the latter is coupled with the spindle 5, and the knife 8 is constrained to follow the swings of the basket 6.

As long as during the supply of material to the basket the slide 12 occupies its innermost position, its projection 45 holds shaft 42 in a position wherein the long lever arms 41 support the clutch member 38 in its elevated position out of engagement with its mating member 35. When the cake has reached the required thickness and the supply of material to the basket has been cut off, a few turns of screw spindle 33 suffice for moving the slide 12 a sufficient distance outwardly to permit shaft 42 to turn in a counter-clockwise direction through an angular distance as to cause the ring 38 to engage ring 35. Further outward movement of the slide 12 causes the knife 8 to engage and scrape off the cake on the inner wall of the basket. When after removal of the cake the slide is again moved inwards, the projection 45 will near the end of its stroke lift the ring 38 out of engagement with the ring 35, when the centrifugal machine is ready for a next operation.

In the embodiment illustrated in Figs. 4 and 5, the beam 11 is in the form of a T, which favorably affects the stability of the beam and does away with the necessity of providing for extra supporting arms 19 shown in Fig. 1. The rubber buffers 18 are here replaced by spring buffers 47, one of which is shown in section, but instead of these spring buffers I could use hydraulic or other means for preventing the beam from rotation and for damping the impacts of said beam in a circumferential direction.

What I claim is:—

1. In apparatus for removing accumulation of material from the wall of a centrifugal basket suspended from a vertical spindle, a scraper, a ploughlike member adapted for cooperation with said scraper to direct material loosened by said scraper to a bottom opening of the basket, a substantially radial guideway for said scraper, means for reciprocating said scraper along said guideway, means for supporting said guideway over the basket, means for preventing said guideway from rotating with the spindle, means allowing said guideway to move in a horizontal plane over said support but preventing it from vertical movement relative to said support, and a clutch device for coupling said guideway with the spindle in such a manner as to permit only of rotary motion of said spindle relative to said guideway.

2. In apparatus for removing accumulation of material from the wall of a centrifugal basket suspended from a vertical spindle, a scraper, a ploughlike member adapted for cooperation with said scraper to direct material loosened by said scraper to a bottom opening of the basket, a substantially radial guideway for said scraper, means for reciprocating said scraper along said guideway, means for supporting said guideway over the basket, means for preventing said guideway from rotating with the spindle, means allowing said guideway to move in a horizontal plane over said support but preventing it from vertical movement relative to said support, means for coupling said guideway with the spindle in such a manner as to permit only of rotary motion of said spindle relative to said guideway, and means for operatively coupling said clutch device with the said scraper reciprocating means.

3. In apparatus for removing accumulation of material from the wall of a centrifugal basket suspended from a vertical spindle, a scraper, a ploughlike member adapted for cooperation with said scraper to direct material loosened by said scraper to a bottom opening of the basket, a substantially radial guideway for said scraper, means for reciprocating said scraper along said guideway, means for supporting said guideway over the basket, means for preventing said guideway from rotating with the spindle, means allowing said guideway to move in a horizontal plane over said support but preventing it from vertical movement relative to said support, a clutch member rotatably mounted on the spindle, a mating clutch member mounted on the said guideway and adapted for vertical movement relative thereto, and actuating means for bringing said mating clutch member into engagement with said clutch member on the spindle.

4. In apparatus for removing accumulation of material from the wall of a centrifugal basket suspended from a vertical spindle, a scraper, a ploughlike member adapted for cooperation with said scraper to direct material loosened by said scraper to a bottom opening of the basket, a substantially radial guideway for said scraper, means for reciprocating said scraper along said guideway, means for supporting said guideway over the basket, means for preventing said guideway from rotating with the spindle, means allowing said guideway to move in a horizontal plane over said support but preventing it from vertical movement relative to said support, a clutch member rotatably mounted on the spindle, a mating clutch member mounted on the said guideway and adapted for vertical movement relative thereto, actuating means for bringing said mating clutch member into engagement with said clutch member on the spindle, and means associated with the said scraper reciprocating means for operating the said actuating means.

5. In apparatus for removing accumulation of material from the wall of a centrifugal basket suspended from a vertical spindle, a scraper, a ploughlike member adapted for cooperation with said scraper to direct material loosened by said scraper to a bottom opening of the basket, a substantially radial guideway for said scraper, means for reciprocating said scraper along said guideway, means for supporting said guideway over the basket, means for preventing said guideway from rotating with the spindle, means allowing said guideway to move in a horizontal plane over said support but preventing it from vertical movement relative to said support, a clutch member rotatably mounted on the spindle, a mating clutch member mounted on the said guideway and adapted for vertical movement relative thereto, actuating means for bringing said mating clutch member into engagement with said clutch member on the spindle, and means associated with the said scraper reciprocating means for operating the said actuating means in such a manner as to close the clutch near the beginning of the outward stroke of the said scraper and release the clutch near the end of the inward stroke of the said scraper.

In testimony whereof I affix my signature.

EVERT van der MOLEN.